United States Patent
Lai et al.

(10) Patent No.: US 8,149,568 B2
(45) Date of Patent: Apr. 3, 2012

(54) LOAD SYSTEM FOR AN MCAP ENERGY STORAGE MODULE

(75) Inventors: James Chyi Lai, Saint Paul, MN (US); Kai Chun Fong, Saint Paul, MN (US)

(73) Assignee: Northern Lights Semiconductor Corp., Saint Paul, MN (US)

( * ) Notice: Subject to any disclaimer, the term of this patent is extended or adjusted under 35 U.S.C. 154(b) by 208 days.

(21) Appl. No.: 12/726,890

(22) Filed: Mar. 18, 2010

(65) Prior Publication Data

US 2011/0228444 A1 Sep. 22, 2011

(51) Int. Cl.
*H01G 9/00* (2006.01)

(52) U.S. Cl. ........ 361/502; 361/503; 361/504; 361/509; 361/512; 361/328

(58) Field of Classification Search .................. 361/502, 361/503–504, 508, 509, 512, 516–517, 328, 361/303–305

See application file for complete search history.

(56) References Cited

U.S. PATENT DOCUMENTS

| 6,611,421 | B2* | 8/2003 | Meadows et al. | 361/328 |
| 7,218,489 | B2* | 5/2007 | Wilk et al. | 361/42 |
| 7,355,840 | B2* | 4/2008 | Doffing et al. | 361/517 |
| 7,511,942 | B2* | 3/2009 | Thrap | 361/502 |
| 7,764,496 | B2* | 7/2010 | Nguyen et al. | 361/697 |
| 7,974,095 | B2* | 7/2011 | Murata | 361/699 |

* cited by examiner

*Primary Examiner* — Nguyen T Ha
(74) *Attorney, Agent, or Firm* — Muncy, Geissler, Olds & Lowe, PLLC (57) ABSTRACT

This invention discloses a load system for loading an Mcap energy storage module to an apparatus, comprising: a storage unit and a load unit. The storage unit further comprises: a first housing part and a seal for sealing the first housing part. The first housing part includes four side walls, a bottom wall and a first opening. A plurality of Mcap cell are disposed in the first housing part through the first opening. A first electrode formed in a side wall. A second electrode formed in another side wall facing the first side wall. The load unit comprises a second housing part and a seal for sealing the second housing part. The storage unit is loaded into the second housing part through the second opening.

21 Claims, 8 Drawing Sheets

LOAD SYSTEM FOR AN MCAP ENERGY STORAGE MODULE

BACKGROUND

1. Field of Invention

The present invention relates to a Load system. More particularly, the present invention relates to a load system for an Mcap energy storage module.

2. Description of Related Art

Energy storage parts are very important in our life. Components such as capacitors used in circuits and batteries used in portable devices, the electrical energy storage parts influence the performance and the working time of the electrical device.

However, traditional energy storage parts have some problems. For example, capacitors have a problem of current leakage decreasing overall performance. Batteries have the memory problem of being partially charged/discharged and decreasing overall performance.

Therefore, a new storage module, Mcap storage module, is developed. The present invention provides a load system for an Mcap energy storage module.

SUMMARY

This invention discloses a load system for loading an Mcap energy storage module to an apparatus, comprising: a storage unit and a load unit. The storage unit further comprises: a first housing part and a seal for sealing the first housing part. The first housing part includes four side walls, a bottom wall and a first opening. A plurality of Mcap cells are disposed in the first housing part through the first opening. A first electrode formed in a side wall. A second electrode formed in another side wall facing the first side wall. The load unit comprises a second housing part and a seal for sealing the second housing part. The storage unit is loaded into the second housing part through the second opening.

In an embodiment, each of the Mcap cells includes a plurality of Mcap formed in a substrate, the Mcaps are connected in parallel connection. Each of the Mcap cells further includes a first connector formed in the substrate, the Mcaps are electrically connected to the first connector.

In another embodiment, the housing part further comprises a plurality of second connectors formed in the bottom wall. When an Mcap cell is slipped into the housing part, the first connector of the Mcap cell connects with the corresponding second connector. A conductor wire formed in the bottom wall to connect the second connectors to the first electrode and the second electrode.

In another embodiment, the second housing part further comprises a load mechanism to protect the storage unit from crashing the load unit. The load mechanism is a spring or a magnetic mechanism. The first housing part further comprises a magnetic device with a special magnetic pole formed in one of sidewalls. When the storage unit is loaded into the second housing, the load mechanism is adjusted to have a magnetic pole different from the special magnetic pole of the magnetic device to attract the storage unit. When the storage unit is unloaded from the second housing, the load mechanism is adjusted to have a magnetic pole the same as the special magnetic pole of the magnetic device to repel the storage unit.

In another embodiment, the apparatus comprises a location part to carry the storage unit. The location part further comprises a third electrode and a fourth electrode, when the storage unit locates on the location part, the first electrode couples with the third electrode and the second electrode couples with the fourth electrode. The third electrode and the fourth electrode couple with other electronic elements of the apparatus.

In another embodiment, the location part further comprises an eject mechanism, wherein the eject mechanism is a spring or a magnetic mechanism. The first housing part further comprises a magnetic device with a special magnetic pole formed in one of the sidewalls. When the storage unit is loaded into the location part, the eject mechanism is adjusted to have a magnetic pole different from the special magnetic pole of the magnetic device to attract the storage unit. When the storage unit is unloaded from the location part, the load mechanism is adjusted to have a magnetic pole the same as the special magnetic pole of the magnetic device to repel the storage unit.

This invention discloses a load system for loading an Mcap energy storage module to an apparatus, comprising: a storage unit; a load unit and a location part in the apparatus. The storage unit further comprises: a first housing part and a seal for sealing the first housing part. The first housing part includes a first side wall, a second side wall, a third side wall, a fourth side wall, a bottom wall and a first opening. A plurality of Mcap cells are disposed in the first housing part through the first opening. A first electrode formed in the first side wall. A second electrode formed in the second side wall facing the first side wall. A first magnetic device formed in the third side wall. A second magnetic device formed in the fourth side wall facing the third side wall. The first magnetic device and the second magnetic have a special magnetic pole. A plurality of track sets are formed in the inside of the first side wall and the second side wall, each track set includes a track for slipping a corresponding Mcap cell into the housing part. The load unit further comprises a second housing part and a seal for sealing the second opening. The storage unit is loaded into the second housing part through a second opening. The load mechanism acted with the first magnetic device. The location part carries the storage unit. The location part further comprises a third electrode and a fourth electrode. When the storage unit locates on the location part, the first electrode couples with the third electrode and the second electrode couples with the fourth electrode. An eject mechanism acted with the second magnetic device.

In an embodiment, when the storage unit is loaded into the location part form, the load mechanism is adjusted to have a magnetic pole the same as the special magnetic pole and the eject mechanism is adjusted to have a magnetic pole different from the special magnetic pole, the storage unit can leave the load unit by a repulsion between the first magnetic device and the load mechanism, and the storage unit can be loaded into the location part by an attraction power between the eject mechanism and the second magnetic mechanism.

In another embodiment, when the storage unit is unloaded from the location part, the load mechanism is adjusted to have a magnetic pole different from the special magnetic pole and the eject mechanism is adjusted to have a magnetic pole same as the special magnetic pole, the storage unit can leave the location part by a repulsion power between the eject mechanism and the second magnetic device and is loaded into the load unit by an attraction power between the first magnetic device and the first load mechanism.

This invention improves the safety and ease-of-use of high energy density Mcap energy storage units. This invention enables the easy addition of more Mcap energy storage units by using a modular design.

BRIEF DESCRIPTION OF THE DRAWINGS

The invention can be more fully understood by reading the following detailed description of the embodiments, with reference made to the accompanying drawings as follows.

DETAILED DESCRIPTION

Mcap (Magnetic Capacitor) is an energy storage technology. This technology increases the energy storing capability more than 1 billion times compared with conventional capacitors, within the same volume and weight. Utilizing this technology rather than the standard used technology would bring much greater efficiency to this market.

Figure 1:
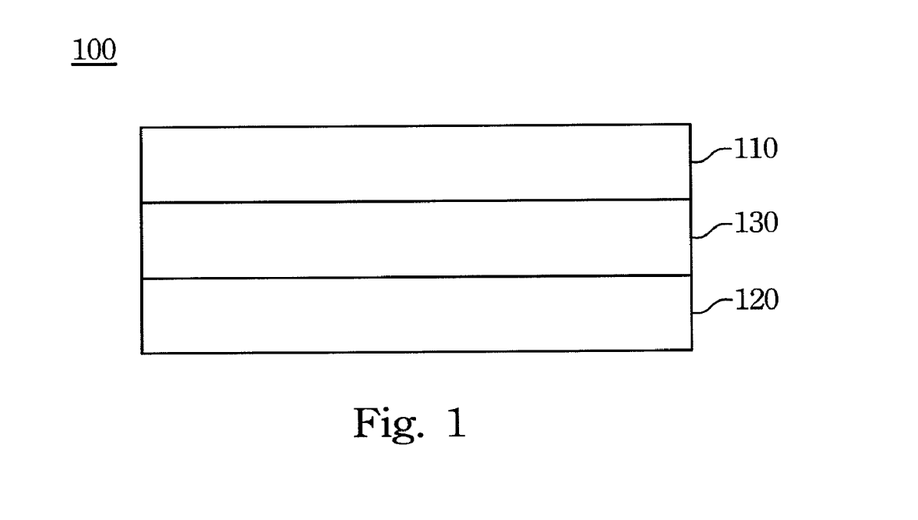
FIG. 1 shows a schematic diagram of Mcap to store electrical energy according to an embodiment of the invention.
Figure 2:
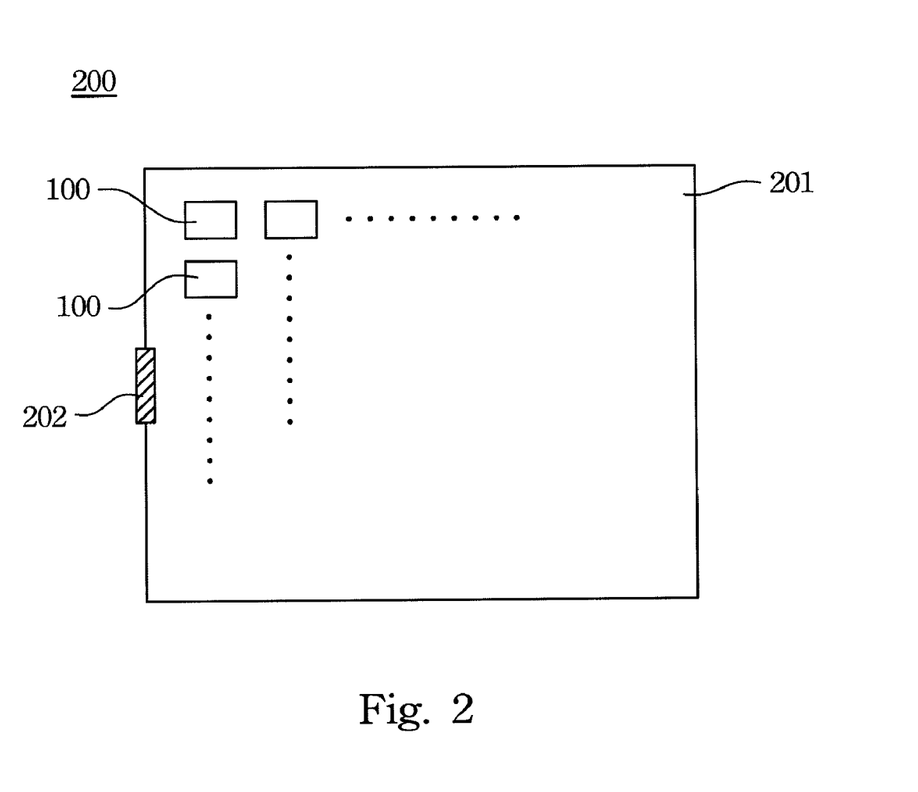
FIG. 2 illustrates a plurality of Mcap fabricated in a substrate together to form an Mcap cell.
Figure 3:
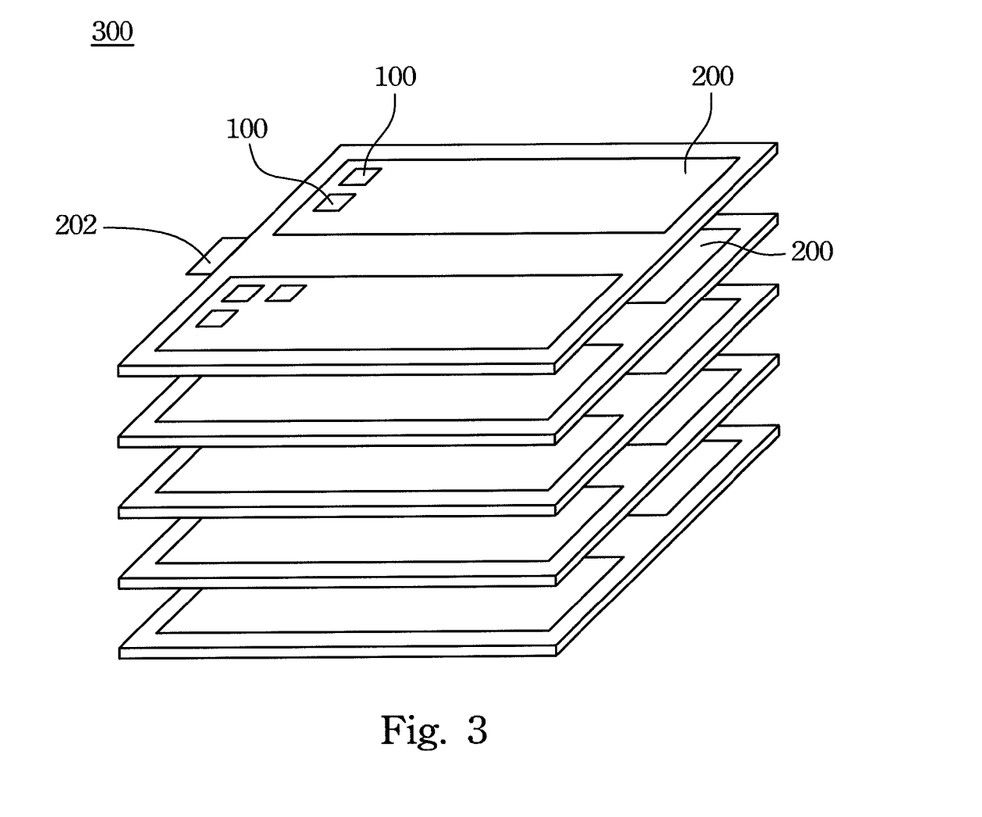
FIG. 3 illustrates a plurality of Mcap cells stacked together to form an Mcap module.

FIG. 1 shows a schematic diagram of Mcap to store electrical energy according to an embodiment of the invention. An Mcap 100 has a first magnetic section 110, a second magnetic section 120, and a dielectric section 130 configured between the first magnetic section 110 and the second magnetic section 120. The dielectric section 130 is arranged to store electrical energy, and the first magnetic section 110 and the second magnetic section 120 with dipoles are arranged to prevent electrical energy leakage. The dielectric section 130 is a thin film, and the dielectric section 130 is composed of dielectric material, such as $BaTiO_3$ or $TiO_3$. A plurality of Mcap 100 can be fabricated in a substrate 201 together to form an Mcap cell 200 as illustrated in FIG. 2. A first connector 202 is formed in the substrate 201 for connecting to an external device. These Mcaps 100 are parallel connection and connected to the connector 202. Moreover, a plurality of Mcap cell 200 can be integrated into a Mcap module 300. In an embodiment, these Mcap cells 200 are stacked together to form a Mcap module 300 as illustrated in FIG. 3.

However, each Mcap module, when fully charged, carries enough power to cause serious injuries or death if not handled properly. Similarly, poor environmental protection will also lead to electrical short circuit resulting in serious damage. Therefore, a safe storage unit is needed to protect an Mcap module.

Figure 4A:
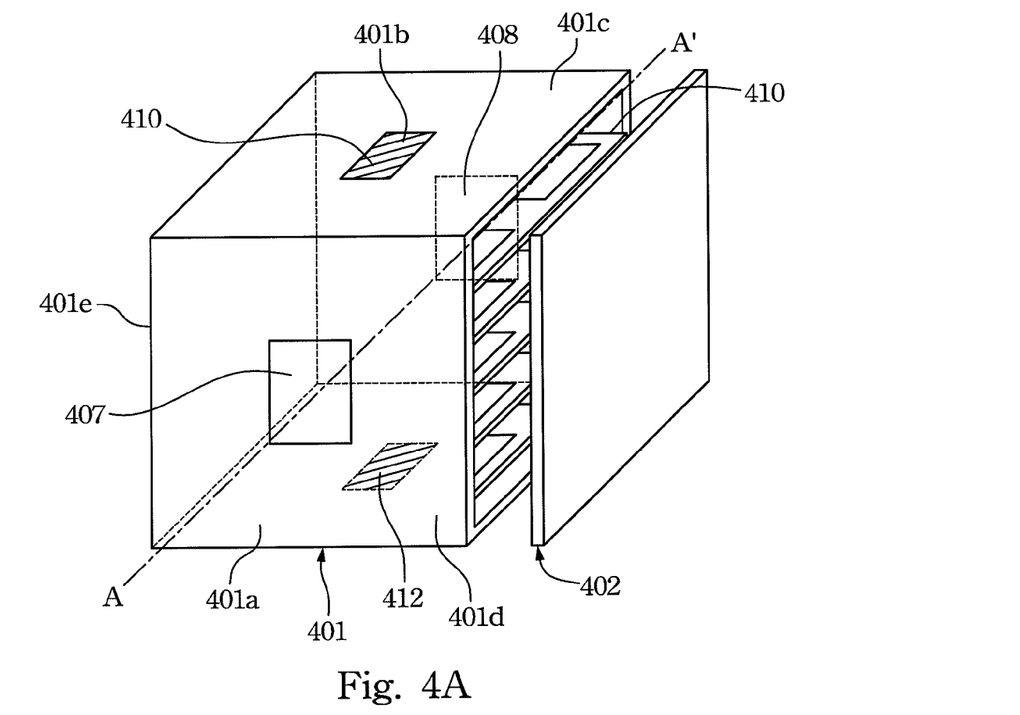
FIG. 4A illustrates a schematic diagram of a storage unit for an Mcap module according to embodiment of the present invention.
Figure 4B:
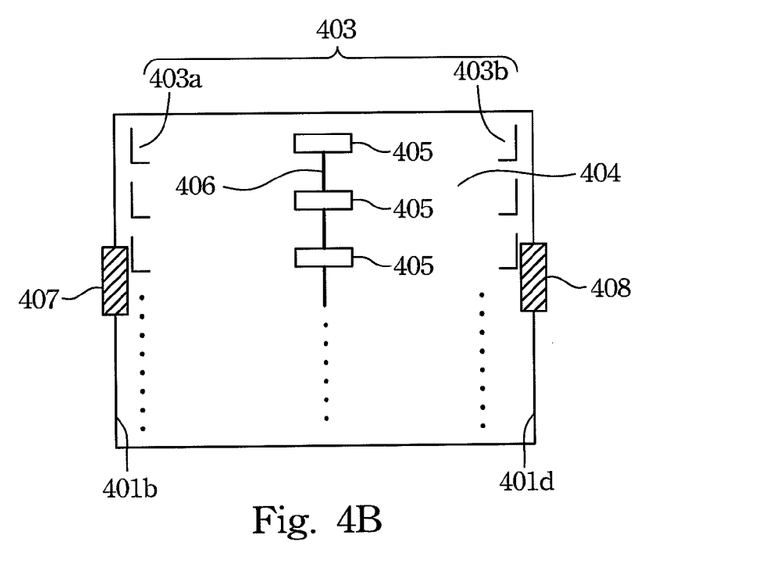
FIG. 4B is a cross-section view diagram from AA' line in the FIG. 4A.

FIG. 4A illustrates a schematic diagram of a storage unit for an Mcap module according to embodiment of the present invention. FIG. 4B is a cross-section view diagram from AA' line in the FIG. 4A. The storage unit 400 is utilized to install an Mcap module 300 therein. The storage unit 400 includes a housing part 401 and cover part 402. The housing part 401 includes four side walls 401a, 401b, 401c and 401d, a bottom wall 401e and an opening 410. The side wall 401a faces the side wall 401c. The side wall 401b faces the side wall 401d. A first electrode 407 formed in the side wall 401a. A second electrode 408 formed in the side wall 401c. The first electrode 407 and the second electrode 408 serve as an anode and a cathode. That is, when an Mcap module 300 is loaded in the storage unit 400 from the opening 410, the Mcap module 300 can supply power to an external device though the first electrode 407 and the second electrode 408. Therefore, an external device can be powered by the Mcap module 300.

In this embodiment, when the Mcap cells 200 are loaded into the housing part 401, the Mcap cells 200 are arranged in parallel with the side wall 401b and 401d. A plurality of track sets 403 are formed in the inside of the side walls 401b and 401d. Each track set 403 includes a track for slipping a corresponding Mcap cell 200 into the housing part 401. In this embodiment, the track set 403 consists of two parallel tracks 403a and 403b that have lengths similar to an edge of the Mcap cell 200. The form of each of the two tracks is L-shaped toward the same orientations. The geometric characteristics of the tracks are not limited herein.

Moreover, a plurality of second connectors 405 are formed in the inside of the bottom side 404. These second connectors 405 are electrically connected together by a conductor wire 406 formed in the inside of the bottom side 404. The conductor wire 406 are connected to the first electrode 407 and the second electrode 408. When Mcap cells 200 are loaded into the housing part 401 through track sets 403, the first connectors 202 of the Mcap cells 200 are connected to the second connectors 405. Because the second connectors 405 are electrically connected together by a conductor wire 406, all Mcap cells 200 are also electrically connected together. Moreover, because the conductor wire 406 are connected to the first electrode 407 and the second electrode 408, the Mcap cells 200 can be powered or power an external device through the first electrode 407 and the second electrode 408. In another embodiment, two additional magnetic mechanism 410 and 412 are formed in the side walls 401b and 401d respectively. The magnetic mechanism 410 and 412 can help the storage unit 400 to load or unload a system. This will be described in the following paragraphs.

When all Mcap cells 200 are loaded into the housing part 404, the housing part 404 is sealed by the cover part 402 to protect the Mcap cells 200 therein.

Figure 5A:
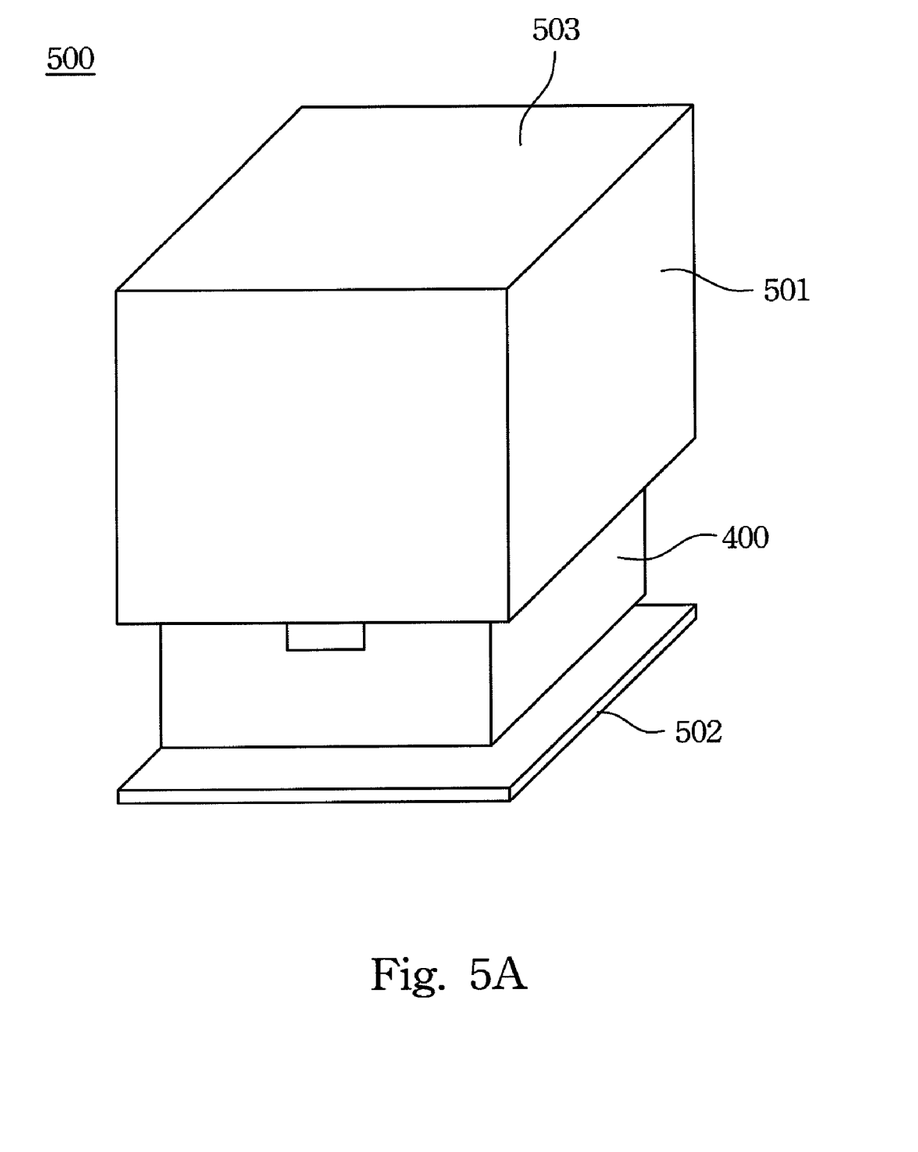
FIG. 5A illustrates a schematic diagram of a load unit. The load unit 500 includes a housing 501 and a seal 502.

On the other hand, a load unit 500 is used to pack the storage unit 400 for improving a process of loading an Mcap module. FIG. 5A illustrates a schematic diagram of a load unit. The load unit 500 includes a housing 501 and a seal 502. The storage unit 400 is located on the seal 502 and the housing 501 covers the storage unit 400.

Figure 5B:
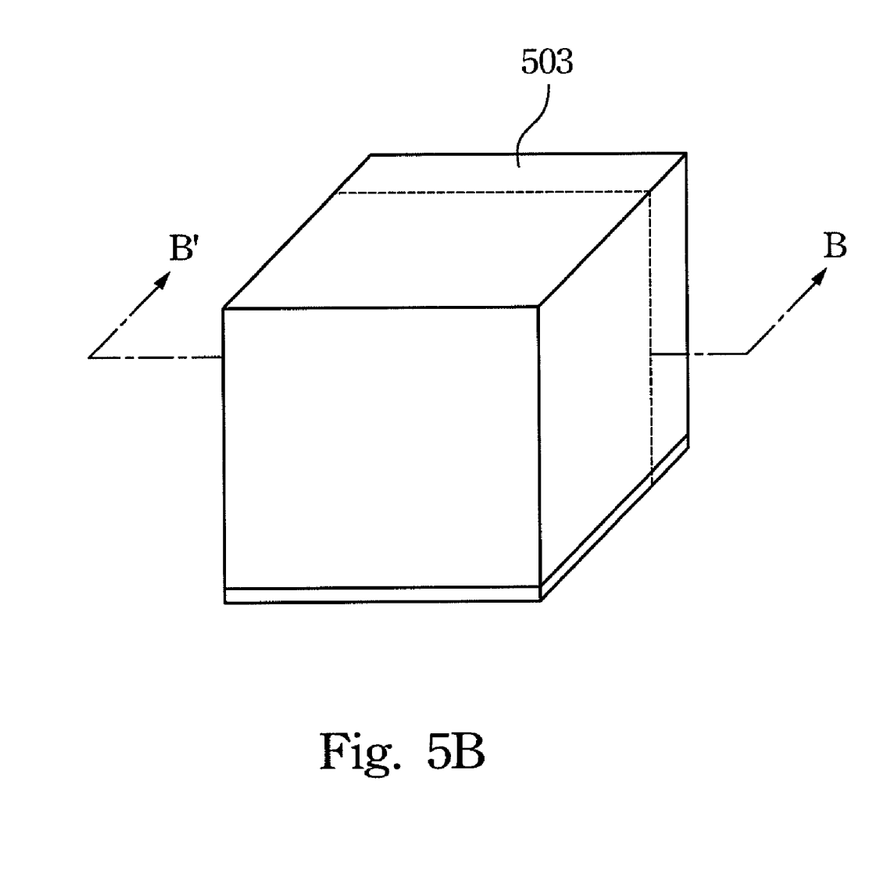
FIG. 5B is a schematic diagram of the storage unit loaded in the load unit.
Figure 5C:
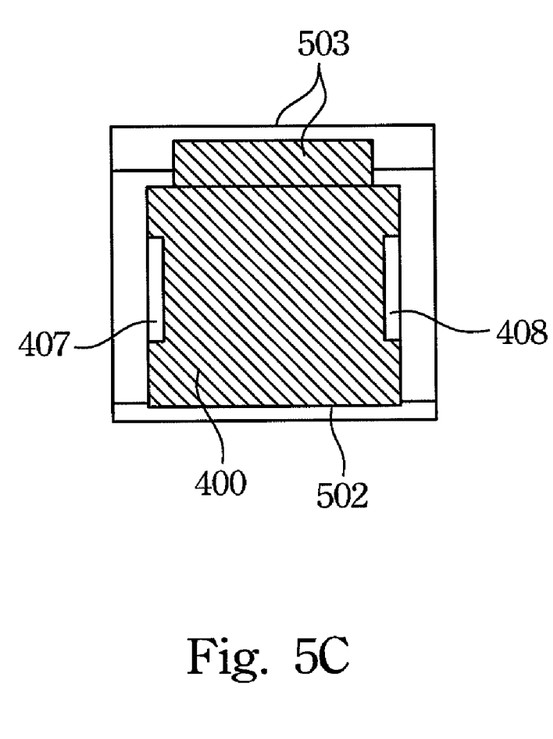
FIG. 5C is a cross-section view diagram from BB' line in the FIG. 5B.

FIG. 5B is a schematic diagram of the storage unit loaded in the load unit. FIG. 5C is a cross-section view diagram from BB' line in the FIG. 5B. A load mechanism, such a spring or a magnetic mechanism, is disposed in the inside of the top surface 503 of the load unit 500. The load mechanism 503 can protect the storage unit 400 from crashing the load unit 500. Moreover, the load mechanism also can help to load the storage unit 400 to load unit 500. In an embodiment, the load mechanism 503 is a magnetic mechanism. In this case, the magnetic mechanism 408 disposed in the surface 401b of the storage unit 400 has a special magnetic pole. When the storage unit 400 is loaded into the load unit 500, the load mechanism 503 is adjusted to have a magnetic pole different from the special magnetic pole of the storage unit 400. Therefore, the load unit 500 attracts the storage unit 400. On the other hand, when the storage unit 400 is unloaded from the load unit 500, the load mechanism 503 is adjusted to have a magnetic pole same as the special magnetic pole of the storage unit 400. Therefore, the storage unit 400 can leave the load unit 500 by a repulsion.

Figure 6A:
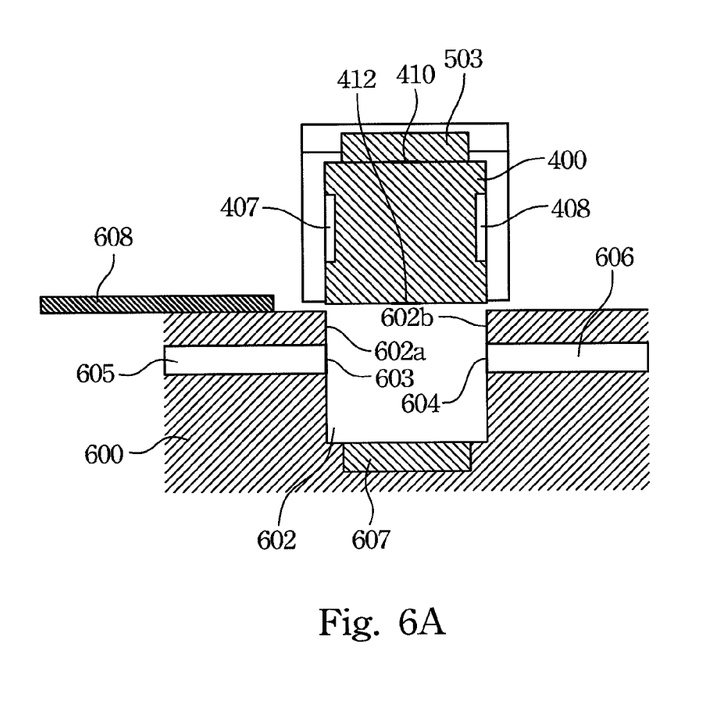
FIG. 6A illustrates a schematic diagram of loading an Mcap module in a system according to an embodiment of the present invention.

FIG. 6A illustrates a schematic diagram of loading an Mcap module in a system according to an embodiment of the present invention. In this embodiment, the Mcap module 300 provides power to an external system 600, such as an electric vehicle. The system 600 has a location part 602 to carry the Mcap module 300. A dust cover 608 covers the location part 602. Two electrodes 603 and 604 are formed in the sidewalls 602a and 602b of the location part 602 respectively. Moreover, two conductor wires 605 and 606 connect with the two electrodes 603 and 604 respectively. Electrical elements of the system 600 connect with the two conductor wires 605 and 606. The height of the two electrodes 603 and 604 is equal to that of the first electrode 407 and the second electrode 408 of the storage unit 400. Therefore, when the Mcap module 300 is loaded into the location part 602, the first electrode 407 and the second electrode 408 connect with the two electrodes 603 and 604 respectively. That is, the power supplied by the Mcap module 300 is carried by the conductor wires 605 and 606 and transmits to the electrical elements in the system 600.

Figure 6B:
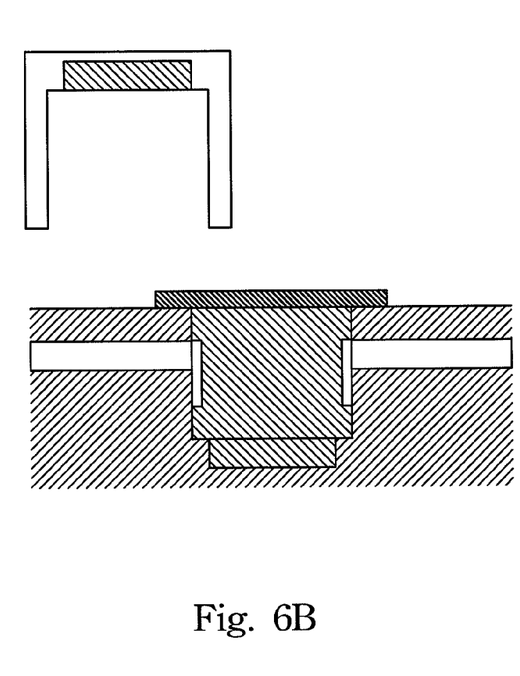
FIG. 6B illustrates the dust cover covers the location part after the storage unit is loaded into the location part.

In another embodiment, an eject mechanism 607 is disposed in the bottom of the location part 602. The eject mechanism 607 protects the storage unit 400 from crashing the bottom side of the location part 602 when the storage unit 400 is loaded into the location part 602. That is, the eject mechanism 607 acts as a buffer. The eject mechanism 607, for example, is a spring or a magnetic mechanism. In an embodiment, the eject mechanism 607 can cooperate with the load mechanism 503. For example, both the eject mechanism 607 and the load mechanism 503 are magnetic mechanism. When the storage unit 400 is loaded into the location part 602, the seal 502 of the load unit 500 is removed first. Then, the load mechanism 503 is adjusted to have a magnetic pole same as the magnetic pole of the magnetic mechanism in the side wall 401b of the storage unit 400 and the eject mechanism 607 is adjusted to have a magnetic pole different from the magnetic pole of the magnetic mechanism in the side wall 401d of the storage unit 400. Accordingly, the storage unit 400 can leave the load unit 500 by a repulsion between the magnetic mechanism 410 and the load mechanism 503 and is loaded into the location part 602 by an attraction power between the eject mechanism 607 and the magnetic mechanism 412. After the storage unit 400 is loaded into the location part 602, the dust cover 608 covers the location part 602 as shown in the FIG. 6B.

Figure 7A:
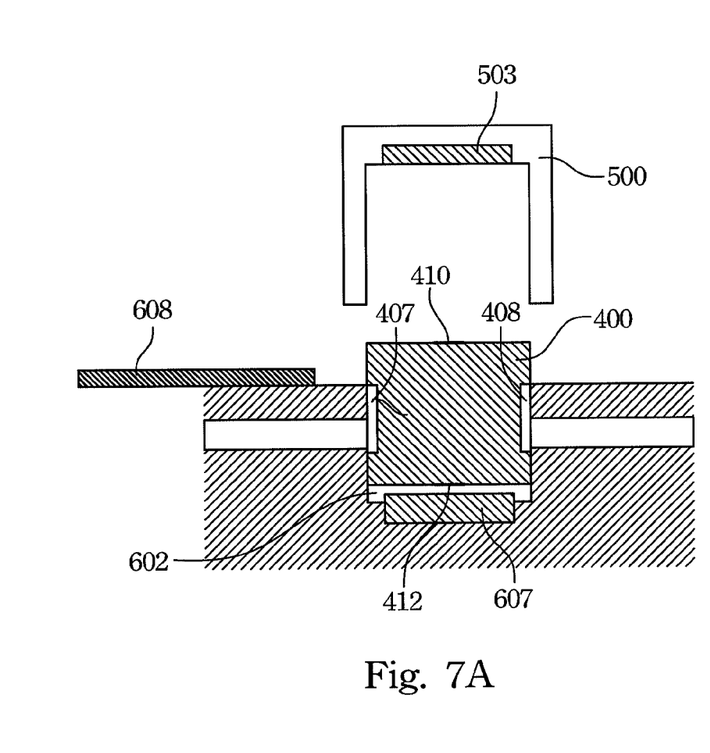
FIG. 7A illustrates a schematic diagram of unloading an Mcap module in a system according to an embodiment of the present invention.
Figure 7B:
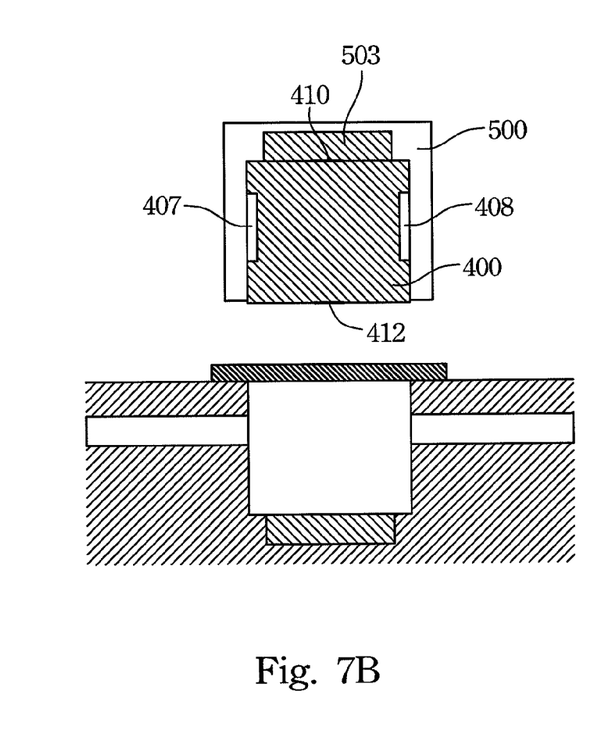
FIG. 7B illustrates the dust cover covers the location part after the storage unit is loaded into the location part.

FIG. 7A illustrates a schematic diagram of unloading a Mcap module in a system according to an embodiment of the present invention. When the storage unit 400 is unloaded from the location part 602, the seal 502 of the load unit 500 is removed first. Then, the load mechanism 503 is adjusted to have a magnetic pole different from the magnetic pole of the magnetic mechanism 410 of the storage unit 400 and the eject mechanism 607 is adjusted to have a magnetic pole the same as the magnetic pole of the magnetic mechanism 412 of the storage unit 400. Accordingly, the storage unit 400 can leave the location part 602 by a repulsion power between the eject mechanism 607 and the magnetic mechanism 412 and is loaded into the load unit 500 by an attraction power between the magnetic mechanism 410 and the load mechanism 503. After the storage unit 400 is loaded into the load unit 500, the dust cover 608 covers the location part 602 as shown in the FIG. 7B.

Figure 8:
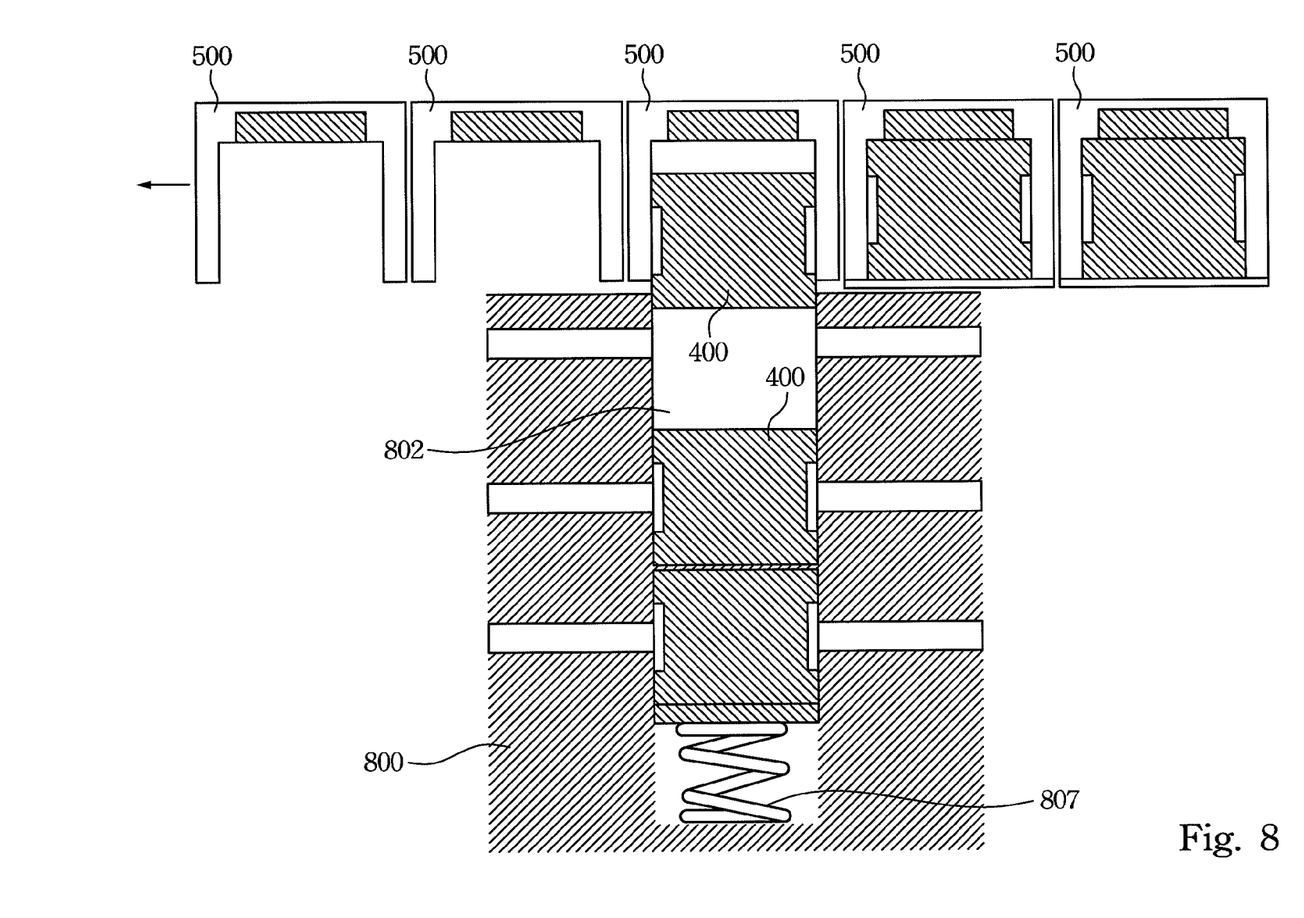
FIG. 8 illustrates a schematic diagram of a continuous loading Mcap module mechanism.

In another embodiment, a continuous loading Mcap module mechanism is adopted to load a plurality of Mcap module in a system when this system requires a plurality Mcap module to supply power. FIG. 8 illustrates a schematic diagram of a continuous loading Mcap module mechanism. In this case, a plurality of load unit 500 is arranged in a row. The load units 500 are moved to follow the direction 500. Therefore, the storage units 400 are sequentially loaded into the location part 802. In this embodiment, the eject mechanism 807 is a spring and acts as a buffer. The eject mechanism 807 protects the storage units 400 from crashing the bottom side of the location part 802 when the storage units 400 are loaded into the location part 802.

The present invention can provide the following advantages:

1. This invention improves the safety and ease-of-use of high energy density Mcap energy storage units.
2. This invention enables the easy addition of more Mcap energy storage units by using a modular design.
3. This invention enables quick system turn around by enabling the easy replacement of fully discharged energy storage modules with fully charged energy storage modules
4. This invention reduces the weight of the overall system.
5. This invention reduces the volume/size of the energy storage system.
6. This invention can provide a higher amount of energy to the system at a lower weight and bulk.

Although the present invention has been described in considerable detail with reference to certain embodiments thereof, other embodiments are possible. Therefore, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A load system for loading an Mcap energy storage module to an apparatus, comprising:
    a storage unit, wherein the storage unit further comprises:
        a first housing part, the first housing part includes four side walls, a bottom wall and an first opening, wherein a plurality of Mcap cell are disposed in the housing part through the first opening; and
        a seal for sealing the first opening;
        wherein a first electrode formed in one, first side wall, of the side walls and a second electrode formed in another side wall, second side wall, facing the first side wall,
        wherein a plurality of track set are formed in the inside of the first side wall and the second side wall, each track set includes a track for slipping a corresponding Mcap cell into the housing part; and
    a load unit, wherein the load unit further comprises:
        a second housing part with an second opening, the storage unit is loaded into the second housing part through the second opening; and
        a seal for sealing the second opening.

2. The system of claim 1, wherein each of the Mcap cells includes a plurality of Mcap formed in a substrate, the Mcaps are connected in parallel connection.

3. The system of claim 2, wherein each of the Mcap cells further includes a first connector formed in the substrate, the Mcaps are electrically connected to the first connector.

4. The system of claim 3, wherein the housing part further comprises a plurality of second connectors formed in the bottom wall.

5. The system of claim 4, wherein when an Mcap cell is slipped into the housing part, the first connector of the Mcap cell connects with the corresponding second connector.

6. The system of claim 4, wherein the housing part further comprises a conductor wire formed in the bottom wall to connect the second connectors to the first electrode and the second electrode.

7. The system of claim 1, wherein the second housing part further comprises a load mechanism to protect the storage unit from crashing the load unit.

8. The system of claim 7, wherein the load mechanism is a spring.

9. The system of claim 7, wherein the load mechanism is a magnetic mechanism.

10. The system of claim 9, wherein the first housing part further comprises a magnetic device with a special magnetic pole formed in one of the sidewalls.

11. The system of claim 10, wherein when the storage unit is loaded into the second housing, the load mechanism is adjusted to have a magnetic pole different from the special magnetic pole of the magnetic device to attract the storage unit.

12. The system of claim 10, wherein when the storage unit is unloaded from the second housing, the load mechanism is adjusted to have a magnetic pole the same as the special magnetic pole of the magnetic device to repel the storage unit.

13. The system of claim 1, wherein the apparatus comprises a location part to carry the storage unit.

14. The system of claim 13, wherein the location part further comprises a third electrode and a fourth electrode, when the storage unit locates on the location part, the first electrode couples with the third electrode and the second electrode couples with the fourth electrode.

15. The system of claim 14, wherein the third electrode and the fourth electrode couple with other electronic elements of the apparatus.

16. The system of claim 13, wherein the location part further comprises an eject mechanism, wherein the eject mechanism is a spring or a magnetic mechanism.

17. The system of claim 16, wherein the first housing part further comprises a magnetic device with a special magnetic pole formed in one of the sidewalls.

18. The system of claim 17, wherein when the storage unit is loaded into the location part, the eject mechanism is adjusted to have a magnetic pole different from the special magnetic pole of the magnetic device to attract the storage unit.

19. The system of claim 17, wherein when the storage unit is unloaded from the location part, the load mechanism is adjusted to have a magnetic pole the same as the special magnetic pole of the magnetic device to repel the storage unit.

20. A load system for loading an Mcap energy storage module to an apparatus, comprising:
   a storage unit, wherein the storage unit further comprises:
      a first housing part, the first housing part includes a first side wall, a second side wall, a third side wall, a fourth side wall, a bottom wall and an first opening, wherein a plurality of Mcap cell are disposed in the housing part through the first opening;
      a first electrode formed in the first side wall;
      a second electrode formed in the second side wall facing the first side wall;
      a first magnetic device formed in the third side wall;
      a second magnetic device formed in the fourth side wall facing the third side wall, wherein the first magnetic device and the second magnetic have a special magnetic pole; and
      a seal for sealing the first opening;
      wherein a plurality of track set are formed in the inside of the first side wall and the second side wall, each track set includes a track for slipping a corresponding Mcap cell into the housing part;
   a load unit, wherein the load unit further comprises:
      a second housing part with a second opening, the storage unit is loaded into the second housing part through the second opening;
      a load mechanism acted with the first magnetic device; and
      a seal for sealing the second opening; and
   a location part in the apparatus to carry the storage unit, wherein the location part further comprises:
      a third electrode and a fourth electrode, when the storage unit locates on the location part, the first electrode couples with the third electrode and the second electrode couples with the fourth electrode;
      an eject mechanism acted with the second magnetic device;
      wherein when the storage unit is loaded into the location part form, the load mechanism is adjusted to have a magnetic pole the same as the special magnetic pole and the eject mechanism is adjusted to have a magnetic pole different from the special magnetic pole, the storage unit can leave the load unit by a repulsion between the first magnetic device and the load mechanism, and the storage unit can be loaded into the location part by an attraction power between the eject mechanism and the second magnetic mechanism;
      wherein when the storage unit is unloaded from the location part, the load mechanism is adjusted to have a magnetic pole different from the special magnetic pole and the eject mechanism is adjusted to have a magnetic pole the same as the special magnetic pole, the storage unit can leave the location part by a repulsion power between the eject mechanism and the second magnetic device and is loaded into the load unit by an attraction power between the first magnetic device and the first load mechanism.

21. The system of claim 20, wherein the third electrode and the fourth electrode couple with other electronic elements of the apparatus.

* * * * *